US012463397B2

(12) United States Patent
Black et al.

(10) Patent No.: US 12,463,397 B2
(45) Date of Patent: Nov. 4, 2025

(54) GENERATING MULTIPLE BEAMS OF A HARMONIC FREQUENCY

(71) Applicant: Microsoft Technology Licensing, LLC, Redmond, WA (US)

(72) Inventors: Richard John Black, Cambridge (GB); Rokas Drevinskas, Cambridge (GB); Patrick Neil Anderson, Cambridge (GB); Masaaki Sakakura, Cambridge (GB); Thomas Torsten DR Winkler, Cambridge (GB); David Lara Saucedo, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 756 days.

(21) Appl. No.: 17/804,368

(22) Filed: May 27, 2022

(65) Prior Publication Data

US 2023/0327391 A1 Oct. 12, 2023

Related U.S. Application Data

(60) Provisional application No. 63/362,729, filed on Apr. 8, 2022.

(51) Int. Cl.
*H01S 3/10* (2006.01)
*G11B 7/127* (2012.01)
(Continued)

(52) U.S. Cl.
CPC .............. *H01S 3/109* (2013.01); *G11B 7/127* (2013.01); *G11B 7/2531* (2013.01); *H01S 3/0092* (2013.01)

(58) Field of Classification Search
CPC ................ H01S 3/109; H01S 3/0092
See application file for complete search history.

(56) References Cited

U.S. PATENT DOCUMENTS 5,936,983 A * 8/1999 Yusong ................... H01S 3/109
372/22
7,463,657 B2 12/2008 Spinelli et al.
(Continued)

FOREIGN PATENT DOCUMENTS

EP 2924500 B1 4/2018
EP 3182531 B1 4/2020
(Continued)

OTHER PUBLICATIONS

Begishev, et al., "High-efficiency, fifth-harmonic generation of a joule-level neodymium laser in a large-aperture ammonium dihydrogen phosphate crystal", In Journal of Optics Express, vol. 29, Issue 2, Jan. 11, 2021, pp. 1879-1889.
(Continued)

*Primary Examiner* — Kinam Park
(74) *Attorney, Agent, or Firm* — Alleman Hall & Tuttle LLP

(57) ABSTRACT

Examples are disclosed that relate to efficiently producing multiple laser beams of a harmonic frequency from a fundamental frequency beam. One example provides a laser system comprising a laser configured to output a fundamental frequency beam, a first harmonic-generation stage, and a second harmonic-generation stage. The first harmonic-generation stage is configured to receive an input of the fundamental frequency beam from the laser, and output from the laser system a first-stage harmonic frequency beam and a first-stage residual fundamental frequency beam. The second harmonic-generation stage is configured to receive an input of the first-stage residual fundamental frequency beam, and to output from the laser system a second-stage harmonic frequency beam.

20 Claims, 12 Drawing Sheets

(51) Int. Cl.
*H01S 3/109* (2006.01)
*G11B 7/2531* (2013.01)
*H01S 3/00* (2006.01)

(56) References Cited

U.S. PATENT DOCUMENTS

| | | |
|---|---|---|
| 9,377,667 B2 | 6/2016 | Muendel et al. |
| 9,912,114 B2* | 3/2018 | Leonardo et al. |
| 2009/0212769 A1* | 8/2009 | Stoica ................... G01R 33/032 324/244.1 |
| 2013/0250982 A1 | 9/2013 | Zhang et al. |
| 2018/0017841 A1* | 1/2018 | Muendel ............... G02F 1/3551 |
| 2021/0057868 A1* | 2/2021 | Simanovski .......... H01S 3/0057 |
| 2021/0208473 A1 | 7/2021 | Jackel et al. |
| 2022/0006263 A1 | 1/2022 | Hirano et al. |
| 2022/0052504 A1* | 2/2022 | Shu ....................... H01S 3/1103 |
| 2022/0390388 A1* | 12/2022 | Smorenburg ......... G03F 7/7065 |

FOREIGN PATENT DOCUMENTS

| | | |
|---|---|---|
| JP | 2010054547 A | 3/2010 |
| WO | 2021034531 A1 | 2/2021 |
| WO | 2021045871 A1 | 3/2021 |

OTHER PUBLICATIONS

Harth, et al., "Two-color pumped OPCPA system emitting spectra spanning 15 octaves from VIS to NIR", In Journal of Optics Express, vol. 17, No. 7, Jan. 30, 2012, pp. 3076-3081.
"International Search Report and Written Opinion Issued in PCT Application No. PCT/US23/015249", Mailed Date: Jun. 14, 2023, 14 Pages.

* cited by examiner

GENERATING MULTIPLE BEAMS OF A HARMONIC FREQUENCY

CROSS REFERENCE TO RELATED APPLICATIONS

This application claims priority to U.S. Provisional Patent Application Ser. No. 63/362,729, titled GENERATING MULTIPLE BEAMS OF A HARMONIC FREQUENCY, filed Apr. 8, 2022, the entirety of which is hereby incorporated herein by reference for all purposes.

BACKGROUND

Laser light of a fundamental frequency may be converted to a higher frequency through harmonic generation. Harmonic generation is an optical process in which n initial photons of a same frequency interact with a nonlinear optical material to generate a new photon with n times the frequency of the initial photons. For example, second-harmonic generation may be used to double the frequency of the laser.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to efficiently producing multiple laser beams of a harmonic frequency from a fundamental frequency beam. One example provides a laser system comprising a laser configured to output a fundamental frequency beam, a first harmonic-generation stage, and a second harmonic-generation stage. The first harmonic-generation stage is configured to receive an input of the fundamental frequency beam from the laser, and output from the laser system a first-stage harmonic frequency beam and a first-stage residual fundamental frequency beam. The second harmonic-generation stage is configured to receive an input of the first-stage residual fundamental frequency beam, and to output from the laser system a second-stage harmonic frequency beam.

DETAILED DESCRIPTION

Figure 1:
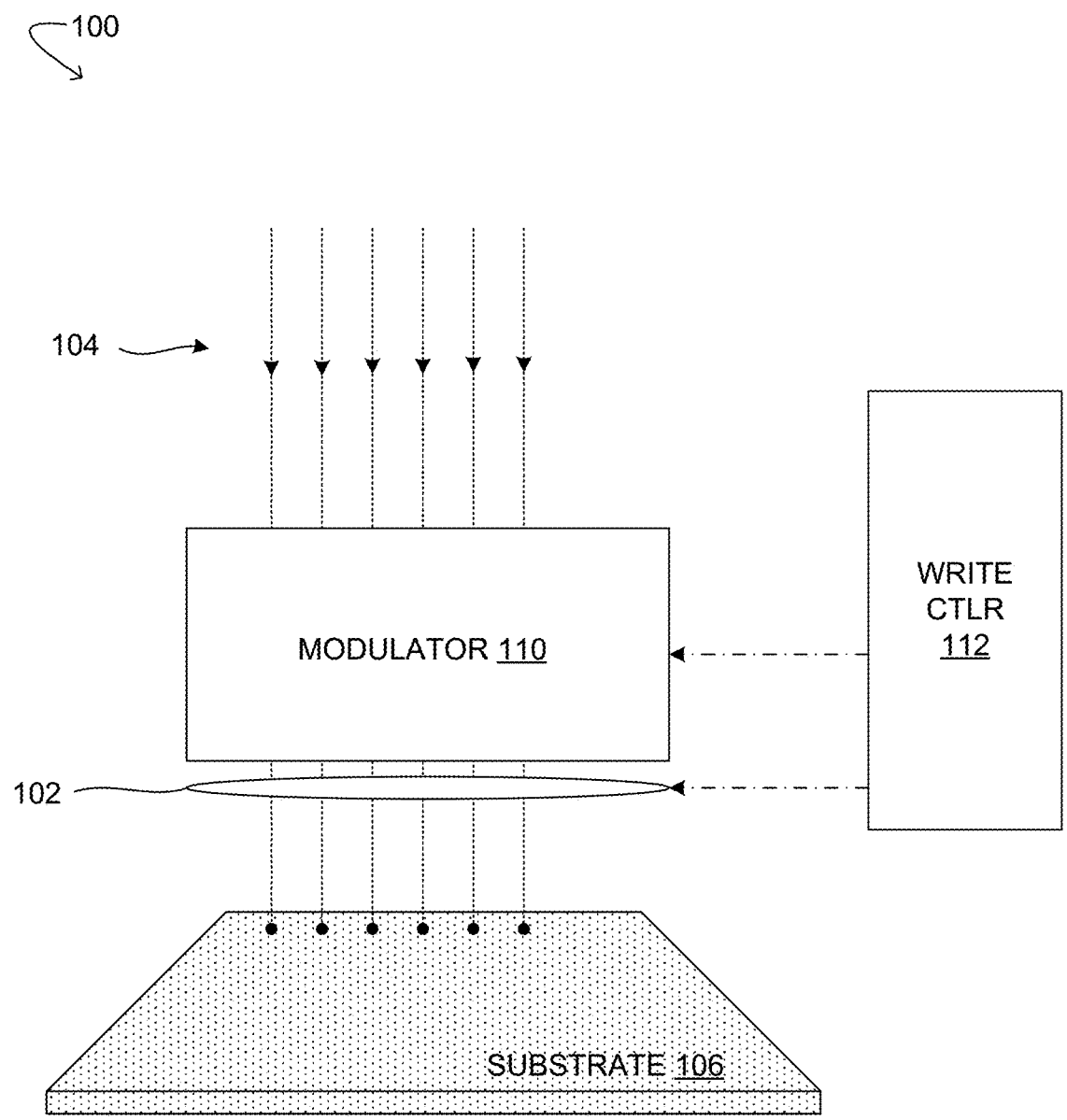
FIG. 1 shows aspects of an example data writing system.

Ultrashort pulse lasers are lasers that output pulses of light with pulse durations on the order of femtoseconds to picoseconds. Ultrashort pulse lasers have a wide range of possible uses. As one example, ultrashort pulse lasers may be used to encode data for storage in a transparent substrate such as glass. When irradiated with laser light of a suitably high instantaneous energy, a non-native modification of the substrate structure can be made in a volume of the substrate at a focus of the laser to write a desired data symbol. This volume may be referred to as a voxel.

As mentioned above, harmonic generation may be used to generate higher frequency laser light from a lower frequency laser. Second-harmonic generation, for example, may utilize a crystal of a nonlinear optical material to produce one photon of the higher frequency light from two photos of the lower frequency light. In some examples of writing data into a glass storage medium, visible laser light used to write the data may be produced from an infrared fundamental laser frequency via second-harmonic generation.

However, the efficiency of harmonic generation of ultrashort pulse lasers is limited by the fundamental process, phase matching and competing nonlinear processes, as well as damage thresholds of nonlinear crystals used to generate the second-harmonic frequency. The efficiency of second-harmonic generation may be on the order of 50% or lower for a high-power ultrashort pulse laser. Thus, in laser processing applications in which only a harmonic wavelength is used, a relatively large fraction of the laser power may be wasted due to non-use of the residual fundamental frequency light.

Accordingly, examples are disclosed that relate to multi-stage harmonic frequency generation in which residual fundamental frequency light from a harmonic-generation stage is used to generate one or more additional output beams via one or more additional harmonic-generation stages. In one disclosed example, a laser system comprises a laser, a first harmonic-generation stage, and a second harmonic-generation stage. The terms "first harmonic-generation stage" and "second harmonic-generation stage" indicate an order in which the stages are arranged in series relative to the laser. The first harmonic-generation stage is configured to receive an input of a fundamental frequency beam from the laser, to output from the laser system a first-stage harmonic frequency beam, and to output a first-stage residual fundamental frequency beam. The second harmonic-generation stage is configured to receive an input of the first-stage residual fundamental frequency beam, and to output from the laser system a second-stage harmonic frequency beam. In some examples, the first-stage harmonic frequency beam and the second-stage harmonic frequency beam can be used in a multi-beam laser application, such as for writing data to and/or reading optical data. In some examples, the first harmonic-generation stage and the second harmonic-generation stage can utilize different nonlinear optical media. In other examples, two or more stages may utilize a same nonlinear optical medium. Further, in some examples, the first-stage harmonic frequency beam and/or the second-stage harmonic frequency beam may be split into a plurality of output beams via a plurality of beam splitters. These and other examples are described in more detail below.

FIG. 1 shows aspects of an example data writing system 100. Data writing system 100 is an example of a system that may utilize a plurality of harmonic ultrashort pulse laser beams generated from a fundamental frequency beam by multiple stages of harmonic generation. Data writing system 100 comprises a focusing optic 102 configured to focus laser irradiance 104 on a data-storage substrate 106. Data writing system 100 further comprises modulator 110 and a write controller 112.

Data writing system 100 is configured to receive laser irradiance 104. Laser irradiance 104 may comprise ultrashort pulse laser irradiation. Laser irradiance 104 is used to write and store data within data-storage substrate 106. In some examples, data-storage substrate 106 may comprise a silica-glass slab. Laser irradiance 104 can induce a long-lived material structural perturbation at its focus, which derives from a non-linear optical process in data-storage substrate 106. In examples in which data is to be written to a plurality of depth layers of data-storage substrate 106, focusing optic 102 may include an adjustable objective lens system configured to focus laser irradiance 104 to any selected depth layer of data-storage substrate 106.

In order to write data at an acceptably high throughput, data writing system 100 may be configured to write a plurality of voxels in parallel. To write data in parallel, laser irradiance 104 may comprise a plurality of beams, so that a corresponding plurality of voxels may be written concurrently. Example laser systems configured to output a plurality of harmonic frequency beams are described in more detail below.

Modulator 110 is configured to control an optical property of each beam of laser irradiance 104 to encode data as material perturbations at voxels in data-storage substrate 106. In some examples, modulator 110 may comprise a spatial light modulator (SLM) configured as a dynamic digital hologram, and/or may comprise a polarization modulator (PM).

In data writing system 100, modulator 110 is coupled operatively to write controller 112. Write controller 112 is configured to provide to modulator 110 electronic control signals that control the modulation to laser irradiance 104 for writing data into voxels in data-storage substrate 106.

As mentioned above, laser light used to write the data may be produced from a fundamental laser frequency via second-harmonic generation. However, the efficiency of harmonic generation of ultrashort pulse lasers may be on the order of 50%. As such, residual fundamental frequency light not used for data writing may be wasted.

Figure 2:
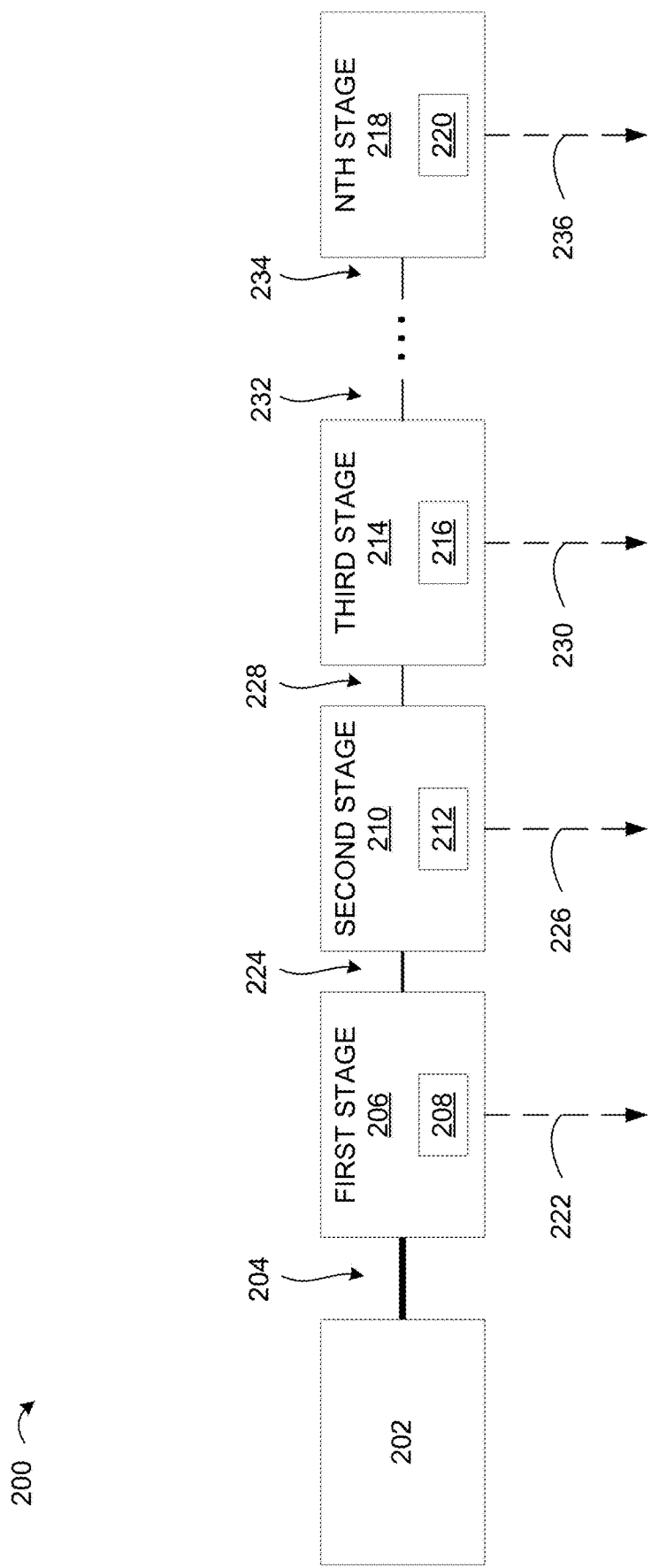
FIG. 2 shows an example laser system configured to output a plurality of harmonic beams via a plurality of harmonic-generation stages.

Thus, FIG. 2 shows an example laser system 200 comprising a plurality of harmonic-generation stages that may help to reduce wasted power. Laser system 200 comprises a laser 202, a first harmonic-generation stage 206 comprising a first nonlinear optical medium 208, a second harmonic-generation stage 210 comprising a second nonlinear optical medium 212, a third harmonic-generation stage 214 comprising a third nonlinear optical medium 216, and a $N^{th}$ harmonic-generation stage 218 comprising an $N^{th}$ nonlinear optical medium 220. The first harmonic-generation stage receives a fundamental frequency beam from the laser, and outputs a harmonic frequency beam and a residual fundamental frequency beam. The second through $N^{th}$ harmonic-generation stages each receives as input a residual fundamental frequency beam from a prior harmonic-generation stage, and uses a portion of the residual fundamental frequency beam to generate an additional harmonic frequency beam. Examples of nonlinear optical media include nonlinear optical crystals, quasi-phase-matched (QPM) nonlinear optical media, and birefringently phase-matched (BPM) media. In the depicted example, "N" indicates any arbitrary number of stages. While FIG. 2 shows at least four harmonic-generation stages, in other examples, a laser system may have three, or even two, harmonic-generation stages.

Laser 202 is configured to output fundamental frequency beam 204 of any suitable wavelength, such as an infrared wavelength. As mentioned above, in some examples, laser 202 can comprise an ultrashort pulse laser, such as a picosecond pulsed laser, a nanosecond pulsed laser, or a femtosecond pulsed laser. First harmonic-generation stage 206 is configured to receive an input of fundamental frequency beam 204 from laser 202, to output from laser system 200 a first-stage harmonic frequency beam 222, and to output a first-stage residual fundamental frequency beam 224. First harmonic-generation stage 206 may be configured to generate a second-harmonic frequency in some examples. In such an example, first-stage harmonic frequency beam 222 has a frequency double that of fundamental frequency beam 204. In examples where fundamental frequency beam 204 comprises an infrared frequency, first-stage harmonic frequency beam 222 comprises a visible frequency, such as a frequency corresponding to green light. In other examples, first harmonic-generation stage 206 may be configured as a third-harmonic frequency generator, or may be configured to generate any other suitable harmonic frequency.

As second-harmonic generation may have a conversion efficiency on the order of 50% for a high-power laser amplifier, the first-stage harmonic frequency beam 222 may comprise approximately 50% or less of the power of fundamental frequency beam 204. Likewise, first-stage residual fundamental frequency beam 224 may comprise approximately 50% or more of the power of fundamental frequency beam 204.

As such, to help increase the efficiency of laser system 200, second harmonic-generation stage 210 is configured to receive an input of first-stage residual fundamental frequency beam 224, to output from laser system 200 a second-stage harmonic frequency beam 226, and to output a second-stage residual fundamental frequency beam 228. Second-stage harmonic frequency beam 226 may comprise approximately 50% or less of the power of first-stage residual fundamental frequency beam 224, and second-stage residual fundamental frequency beam 228 may comprise approximately 50% or more of the power of first-stage residual fundamental frequency beam 224.

The use of second harmonic-generation stage 210 may reduce an overall energetic waste of laser power of laser 202 compared to the use of a single harmonic-generation stage. In a data writing application, this may provide cost savings as well as more efficient data writing due to less wasted power. Where first harmonic-generation stage 206 is configured to generate a second-harmonic frequency, second harmonic-generation stage 210 also may be configured to generate a second-harmonic frequency.

Third harmonic-generation stage 214 is configured to receive an input of second-stage residual fundamental frequency beam 228, and to output from laser system 200 a third-stage harmonic frequency beam 230. As described above with regard to first harmonic-generation stage 206 and second harmonic-generation stage 210, third-stage harmonic frequency beam 230 may comprise approximately 50% or less of the power of second-stage residual fundamental frequency beam 228. Likewise, a third-stage residual fundamental frequency beam 232 may comprise approximately 50% or more of the power of second-stage residual fundamental frequency beam 228. Similarly, $N^{th}$ harmonic-generation stage 218 is configured to receive an input of a $(N^{th}-1)$-stage residual fundamental frequency beam 234, and to output from laser system 200 a $N^{th}$-stage harmonic frequency beam 236. Each harmonic-generation stage may help to reduce an amount of power wasted as residual frequency light.

In some examples, first-stage harmonic frequency beam 222, second-stage harmonic frequency beam 226, third-stage harmonic frequency beam 230, and $N^{th}$-stage harmonic frequency beam 236 may be used to run parallel optical data writing lines, as well as for multi-beam data writing. In other applications the harmonic frequency beams may be used in any other suitable application that utilizes parallelization and/or multi-beam exposure.

Figure 3:
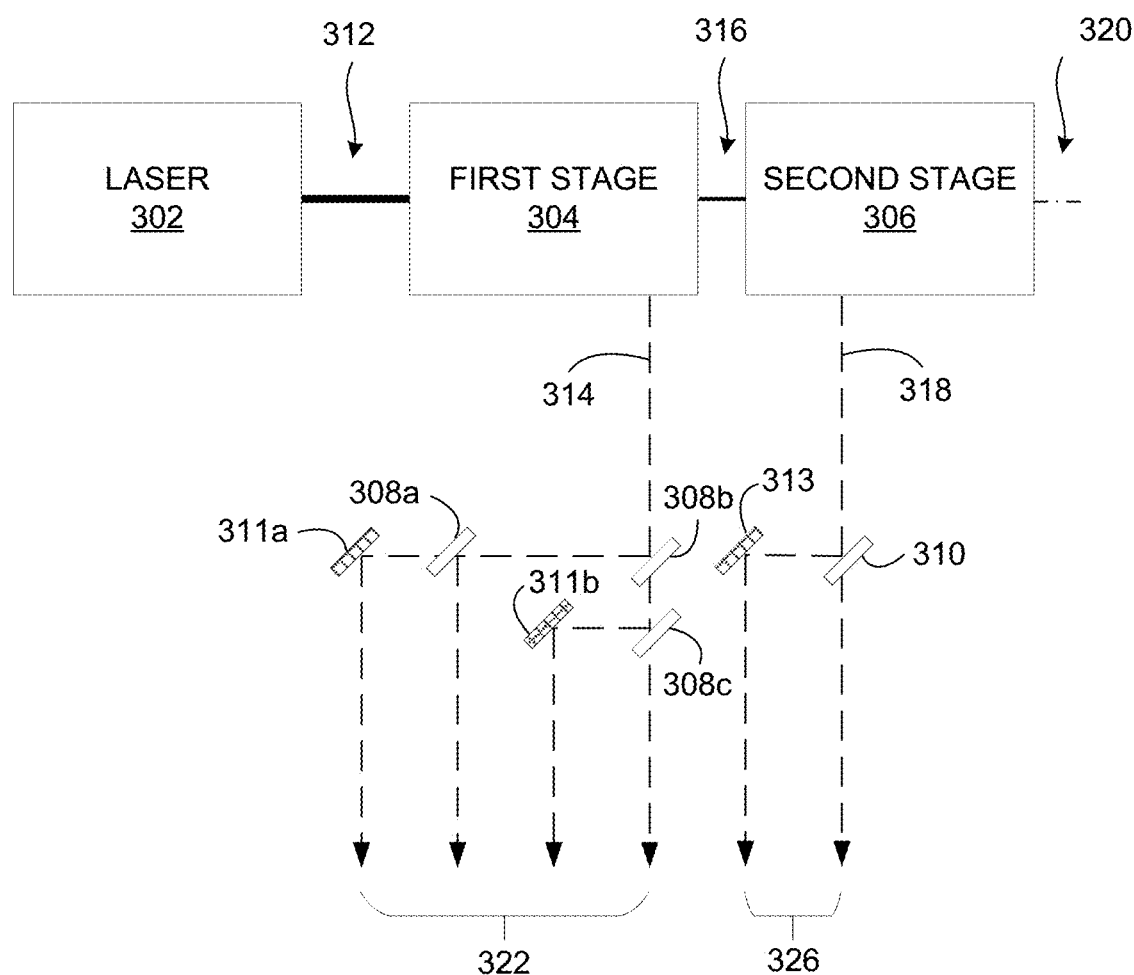
FIG. 3 shows an example laser system comprising a plurality of beam splitters.

Each harmonic-generation stage of laser system 200 may comprise a dichroic mirror or other suitable optic configured to separate the residual fundamental frequency beam and the harmonic frequency beam. In some examples, laser system 200 further may comprise one or more beam splitters configured to split each of one or more harmonic frequency beams into a plurality of output beams. FIG. 3 shows an example laser system 300 that utilizes beam splitters to generate a plurality of output beams. Laser system 300 comprises a laser 302, a first harmonic-generation stage 304, and a second harmonic-generation stage 306. First harmonic-generation stage 304 comprises a first, greater number of first-stage beam splitters 308a, 308b, 308c. Second harmonic-generation stage comprises a second, lesser number of second-stage beam splitters, here depicted as a single beam splitter 310. FIG. 3 further depicts mirrors 311a and 311b and 313.

Laser 302 is configured to output a fundamental frequency beam 312. First harmonic-generation stage 304 is configured to receive an input of fundamental frequency beam 312, to output from laser system 300 a first-stage harmonic frequency beam 314, and to output a first-stage residual fundamental frequency beam 316. As second-harmonic generation may have a conversion efficiency on the order of 50% for a high-power laser amplifier, first-stage harmonic frequency beam 314 may comprise approximately 50% or less of the power of fundamental frequency beam 312.

Second harmonic-generation stage 306 is configured to receive an input of first-stage residual fundamental frequency beam 316 and to output from laser system 300 a second-stage harmonic frequency beam 318. As described above with regard to first-stage harmonic frequency beam 314, second-stage harmonic frequency beam 318 may comprise approximately 50% or less of the power of first-stage residual fundamental frequency beam 316. Further, second-stage residual fundamental frequency beam 320 may comprise approximately 50% or more of the power of the first-stage residual fundamental frequency beam 316.

Beam splitters 308a, 308b, 308c are configured to split first-stage harmonic frequency beam 314 into a plurality of first-stage output beams 322. In the depicted example, each beam splitter 308a, 308b, 308c is configured to reflect approximately half of incident light and transmit a remainder of the incident light. Beam splitter 310 is configured to split second-stage harmonic frequency beam 318 into a plurality of second-stage output beams 326. As first-stage harmonic frequency beam 314 may have approximately twice the power of second-stage harmonic frequency beam 318, splitting first-stage harmonic frequency beam 314 into four first-stage output beams 322 and splitting second-stage harmonic frequency beam 318 into two second-stage output beams 326 may result in the production of six output beams of similar power. In some examples, plurality of first-stage output beams 322 and plurality of second-stage output beams 326 are configured as write beams in a data writing system configured to write data into a recording medium, such as data writing system 100. In other examples, plurality of first-stage output beams 322 and plurality of second-stage output beams 326 may be used in any other suitable application.

Mirrors 311a and 311b, and 313 are configured to redirect harmonic-frequency output beams in desired directions. In other examples, mirrors 311a, 311b, 313 may be omitted, and/or any other suitable optics may be used to direct an output beam in a desired direction.

Figure 4:
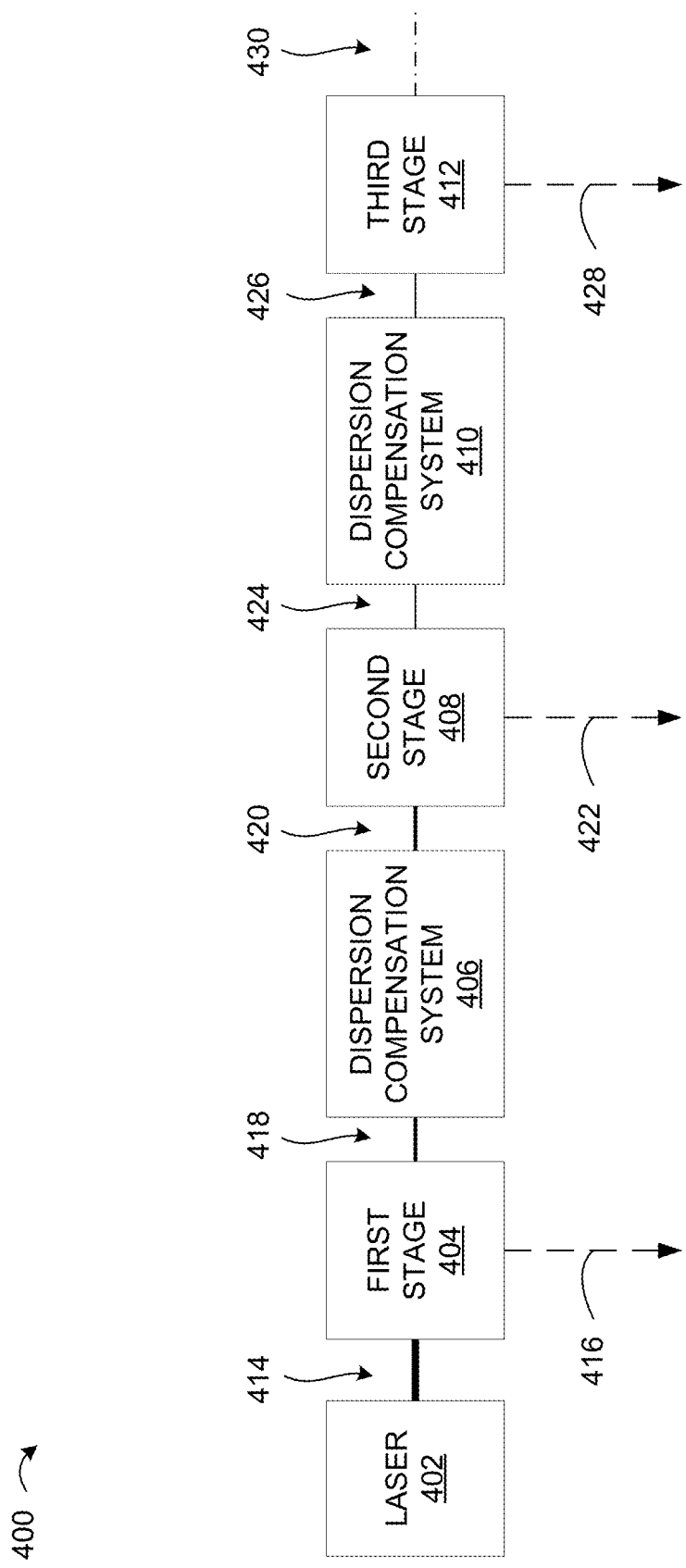
FIG. 4 shows an example laser system that utilizes dispersion compensation between harmonic-generation stages.

Residual fundamental frequency beams may have some dispersion caused by a harmonic-generation stage in a laser system. This dispersion may impact a performance of a subsequent harmonic-generation stage in some examples. Thus, an optical system configured to produce multiple harmonic beams may include a dispersion compensation system. FIG. 4 shows an example laser system 400 that utilizes dispersion compensation. Laser system 400 comprises a laser 402, a first harmonic-generation stage 404, a first dispersion compensation system 406, a second harmonic-generation stage 408, a second dispersion compensation system 410, and a third harmonic-generation stage 412. Laser 402 is configured to output a fundamental frequency beam 414. First harmonic-generation stage 404 is configured to receive an input of fundamental frequency beam 414 from laser 402, output from laser system 400 a first-stage harmonic frequency beam 416, and output a first-stage residual fundamental frequency beam 418. First dispersion compensation system 406 is configured to compensate for dispersion of first-stage residual fundamental frequency beam 418, and to output a compensated first-stage residual fundamental frequency beam 420. Such a configuration may reduce an effect of dispersion on a beam quality of first-stage residual fundamental frequency beam 418. For example, first dispersion compensation system 406 may help to reduce an elongation of a pulse duration of first-stage residual fundamental frequency beam 418. In some examples, first dispersion compensation system 406 also may be configured as a dispersion and polarization compensation stage to compensate for a polarization change of first-stage residual fundamental frequency beam 418, and/or for other suitable optical phenomenon.

Second harmonic-generation stage 408 is configured to receive an input of compensated first-stage residual fundamental frequency beam 420, output from laser system 400 a second-stage harmonic frequency beam 422, and output a second-stage residual fundamental frequency beam 424. Similarly, third harmonic-generation stage 412 is configured to receive an input of a compensated second-stage residual fundamental frequency beam 426, and to output from laser system 400 a third-stage harmonic frequency beam 428.

Second dispersion compensation system 410 is configured to compensate for dispersion of second-stage residual fundamental frequency beam 424, and to output compensated second-stage residual fundamental frequency beam 426. While FIG. 4 shows an optical system comprising three harmonic-generation stages and two dispersion compensation stages, in other examples, a laser system may have any suitable number of harmonic-generations stages and dispersion compensation stages.

Figure 5:
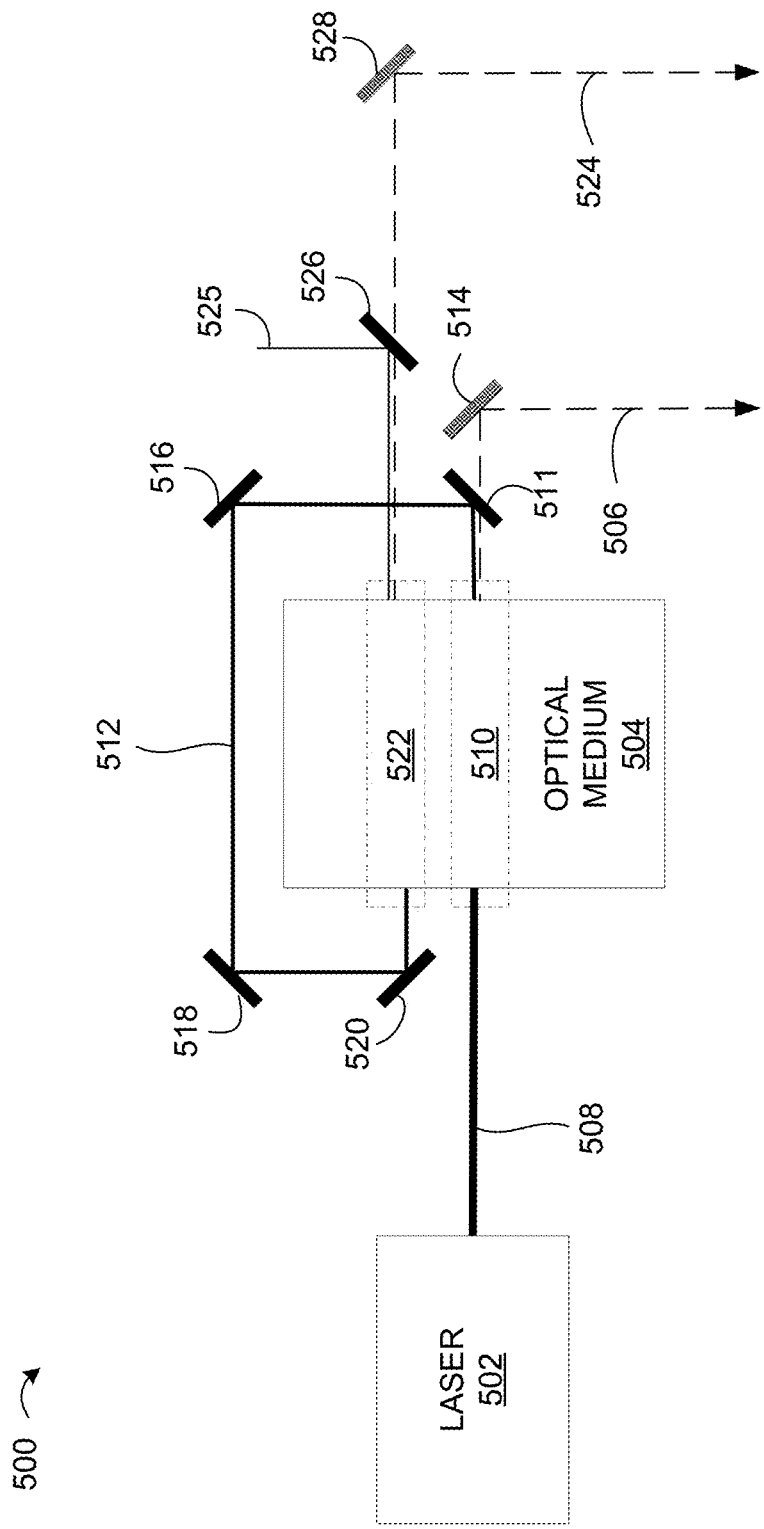
FIG. 5 shows an example laser system that utilizes a same nonlinear optical medium for two harmonic-generation stages.

In some examples, an optical system for generating and outputting multiple harmonic frequency beams may utilize a same nonlinear optical medium for one or more harmonic-generation stages. FIG. 5 shows such an example laser system 500. Laser system 500 comprises a laser 502 and a nonlinear optical medium 504 configured to generate a first-stage harmonic frequency beam 506 from a fundamental frequency beam 508 in a first harmonic-generation stage 510. Laser system 500 further comprises a dichroic mirror or other wavelength-dependent splitter 511 configured to separate first-stage harmonic frequency beam 506 from first-stage residual fundamental frequency beam 512. FIG. 5 further shows a mirror 514 configured to redirect first-stage harmonic frequency beam 506. In other examples, mirror 514 may be omitted, and/or any other suitable optics may be used to redirect first-stage harmonic frequency beam 506.

First-stage residual fundamental frequency beam 512 is directed around a folded optical path via mirrors 516, 518, and 520 to pass through nonlinear optical medium 504 in a second harmonic-generation stage 522. The second harmonic-generation stage 522 generates and outputs a second-stage harmonic frequency beam 524, and a second-stage residual fundamental frequency beam 525. A dichroic mirror 526 may be used to separate second-stage harmonic frequency beam 524 and second-stage residual fundamental frequency beam 525. FIG. 5 further shows a mirror 528 configured to redirect second-stage harmonic frequency beam 524. In other examples, mirror 528 may be omitted, and/or any other suitable optics may be used to redirect second-stage harmonic frequency beam 524.

In such a manner, additional harmonic-generation stages may utilize same nonlinear optical medium 504. The use of nonlinear optical medium 504 for multiple harmonic-generation stages may help to reduce a cost of laser system 500 compared to systems that use separate nonlinear optical media for each harmonic-generation stage.

In the depicted example, an optical path through first harmonic-generation stage 510 and an optical path through second harmonic-generation stage 522 are spatially separated within nonlinear optical medium 504. In some such examples, the optical path through first harmonic-generation stage 510 and the optical path through second harmonic-generation stage 522 are separated by at least a width of first-stage residual fundamental frequency beam 512. In other examples, the optical path through first harmonic-generation stage 510 and the optical path through second harmonic-generation stage 522 may spatially overlap. In such examples, light pulses may be configured to be temporally separated to avoid thermally damaging nonlinear optical medium 504.

In some examples, the plurality of harmonic frequency beams generated by laser system 500 may be used to operate parallel optical data writing lines and/or perform multi-beam data writing. In other applications the harmonic frequency beams may be used in any other suitable application that utilizes parallelization and/or multi-beam processes, such as an industrial process for glass cutting.

Figure 6:
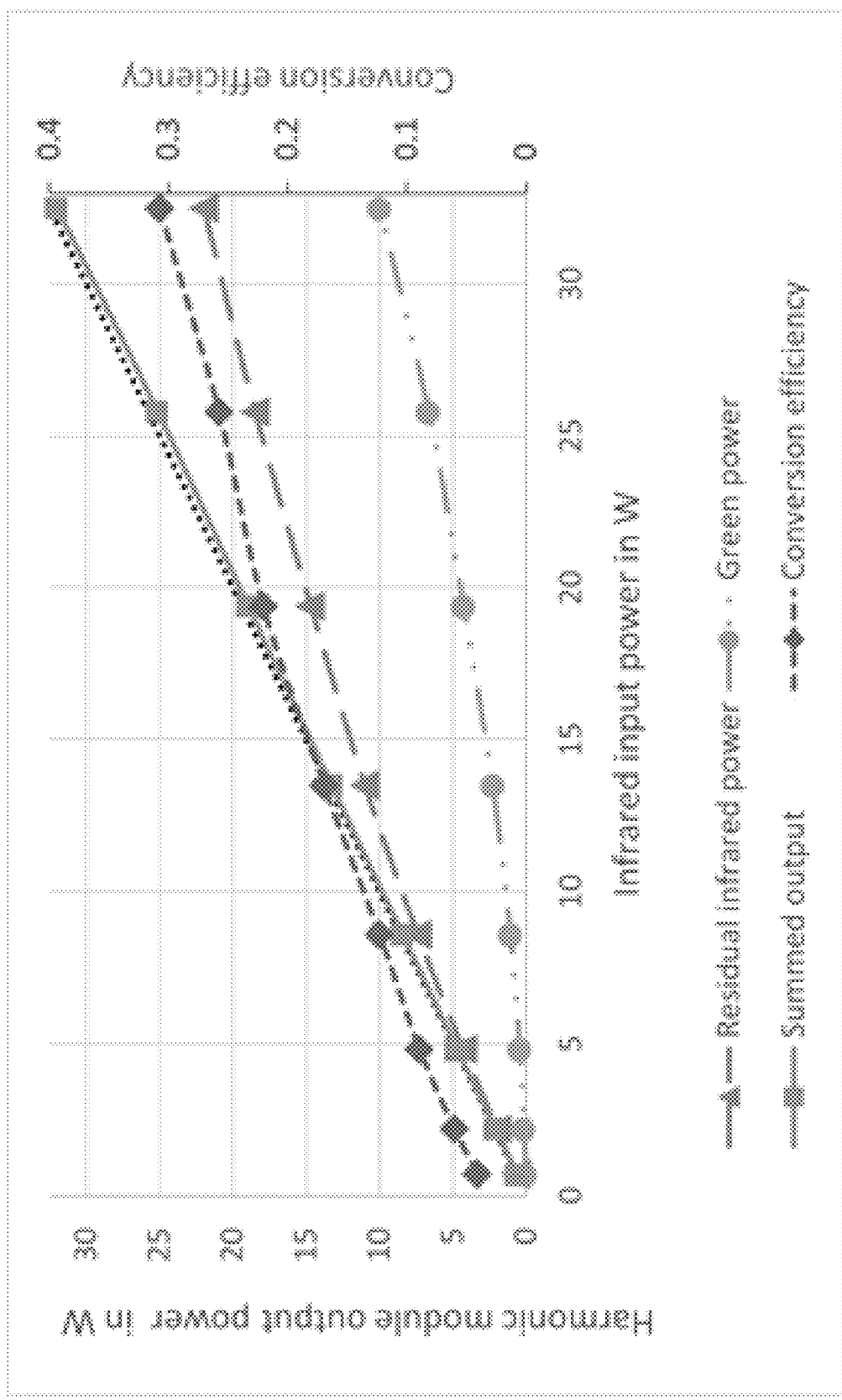
FIG. 6 depicts an example plot of measured power of a harmonic frequency beam and a residual fundamental frequency beam as a function of a power of a fundamental frequency beam.

As previously mentioned, second-harmonic generation may have a conversion efficiency on the order of 50% for a high-power laser amplifier. FIG. 6 depicts measured power of a residual fundamental frequency beam and measured power of a harmonic frequency beam based on a power of a fundamental frequency beam (indicated along the x-axis). In FIG. 6, a laser system provided the fundamental frequency beam at a maximum power of 50 W (watts) at a wavelength of 1030 nm (nanometers) (e.g., infrared light), which was converted via a commercial harmonic module into a second-harmonic frequency beam comprising a power of 20 W at a wavelength of 515 nm (e.g., green light), thus providing a conversion efficiency of 40%.

FIG. 6 shows the dependence of residual infrared power and second-harmonic power as a function of laser power, showing conversion efficiencies below 5% at 700 mW through 30% at 32 W of infrared input power. Further, summed output power and maximum possible summed output power (e.g., output power of the harmonic module=input power of the harmonic module) are charted versus the laser power (e.g., of the fundamental frequency beam). An overall loss (e.g., losses from reflection and absorption) of the harmonic module is noted below 2%. Thus, after a first harmonic-stage, sufficient residual fundamental frequency beam power is left for a subsequential harmonic-stage and that other loses are small, and therefore may allow for many harmonic conversion cycles.

Figure 7:
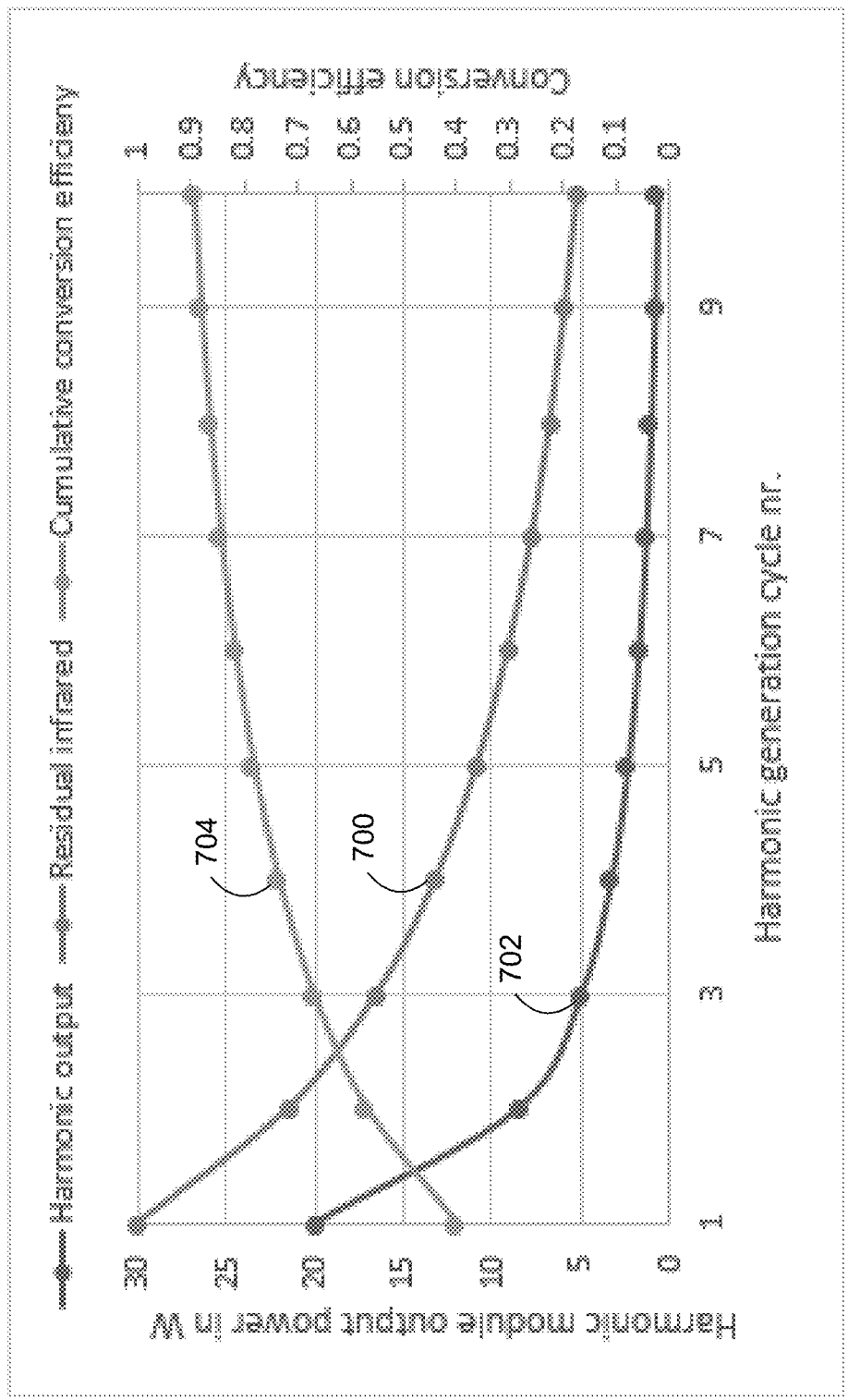
FIG. 7 depicts example plots of calculated power of a harmonic frequency beam, calculated power of a residual fundamental frequency beam, and a cumulative conversion efficiency as a function of a number of harmonic generation cycles.

FIG. 7 depicts calculated output power of a residual fundamental frequency beam 700 and calculated output power of a harmonic frequency beam 702 after each generation cycle in a same harmonic module based on the measurements of FIG. 6. Further, FIG. 7 also shows a cumulative harmonic conversion efficiency 704 of an initial infrared laser power of 50 W after each cycle. FIG. 7 represents the simplest case of multi-cycle harmonic generation, in which neither the harmonic module, nor the beam characteristics (e.g., beam size) are changed. The output power of the harmonic frequency beam 702 drops quickly with each harmonic-generation cycle. However, cumulative harmonic conversion efficiency 704 reaches over 70% after four generation cycles, and as such is an increase over a conversion efficiency of 40% after one generation cycle. Further, a cumulative harmonic conversion efficiency 704 of around 78% is calculated after 5 cycles. Depending on an application, factors such as a necessary harmonic power, cost, and complexity may define a number of harmonic generation cycles that can be used and in some examples, the cumulative harmonic conversion efficiency 704 may be increased by adapting an efficiency of subsequent harmonic generation cycles (e.g., efficiency tuning).

Figure 8:
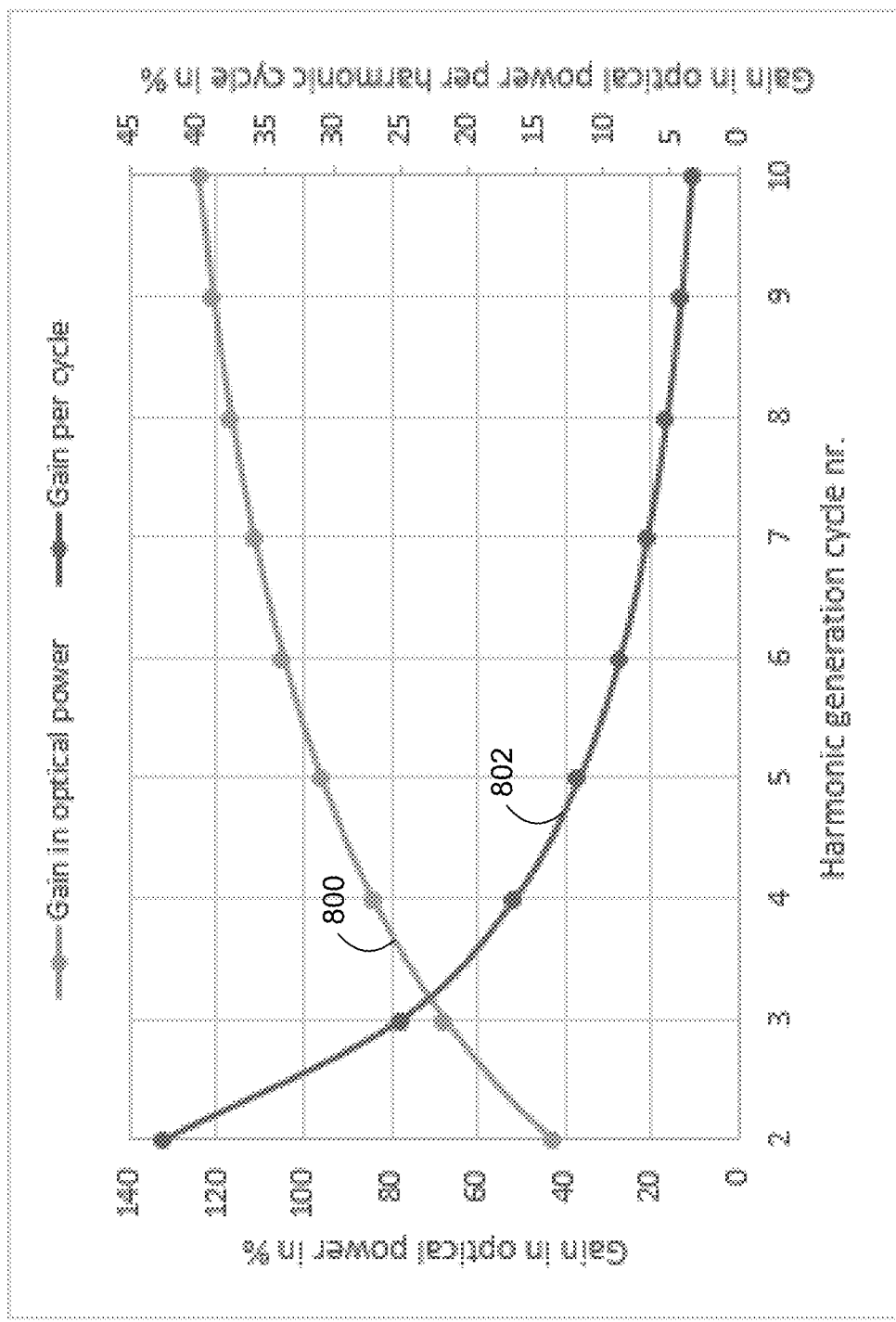
FIG. 8 depicts example plots of percent gain in optical power and percent gain in optical power per harmonic cycle as a function of a number of harmonic cycles.

FIG. 8 shows a number of harmonic-generation cycles and a gain in harmonic power in comparison to using a single harmonic-generation cycle. Calculated gain of total harmonic power 800 and calculated gain per harmonic generation cycle 802 are charted as a function of a number of harmonic generation cycles. FIG. 8 illustrates that efficiency gains per cycle reduce with each additional cycle.

Figure 9:
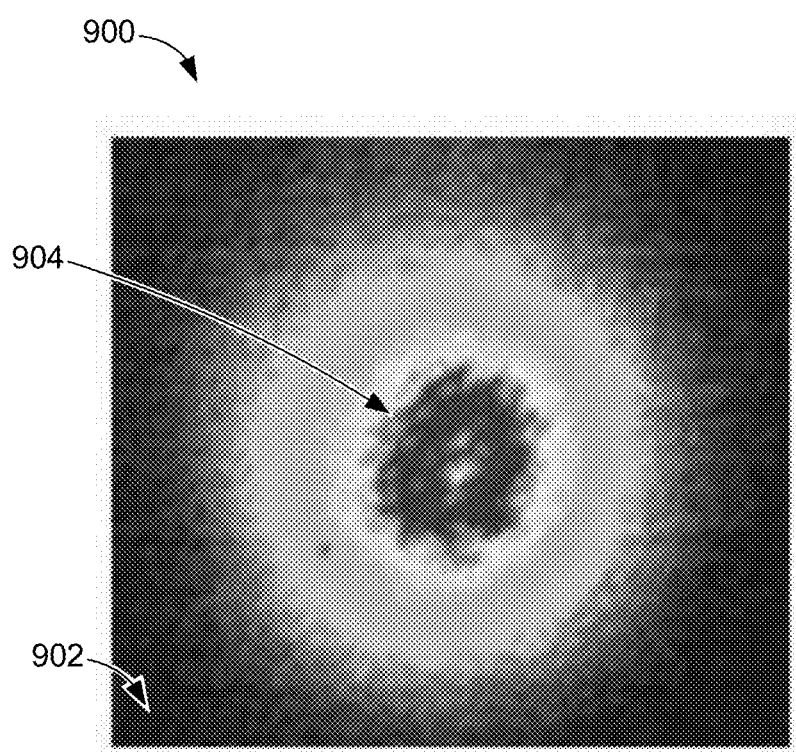
FIG. 9 depicts an example of a measured spatial profile of a residual fundamental frequency beam after a second-harmonic module.

FIG. 9 shows a measured spatial profile 900 of the residual fundamental frequency beam 10 cm (centimeters) after an exit of the harmonic module. Spatial profile 900 has a low intensity region as indicated at 902 and a high intensity region as indicated at 904. Further, spatial profile 900 follows a Gaussian distribution, and thus may be of sufficiently good quality for further harmonic generation.

Figure 10:
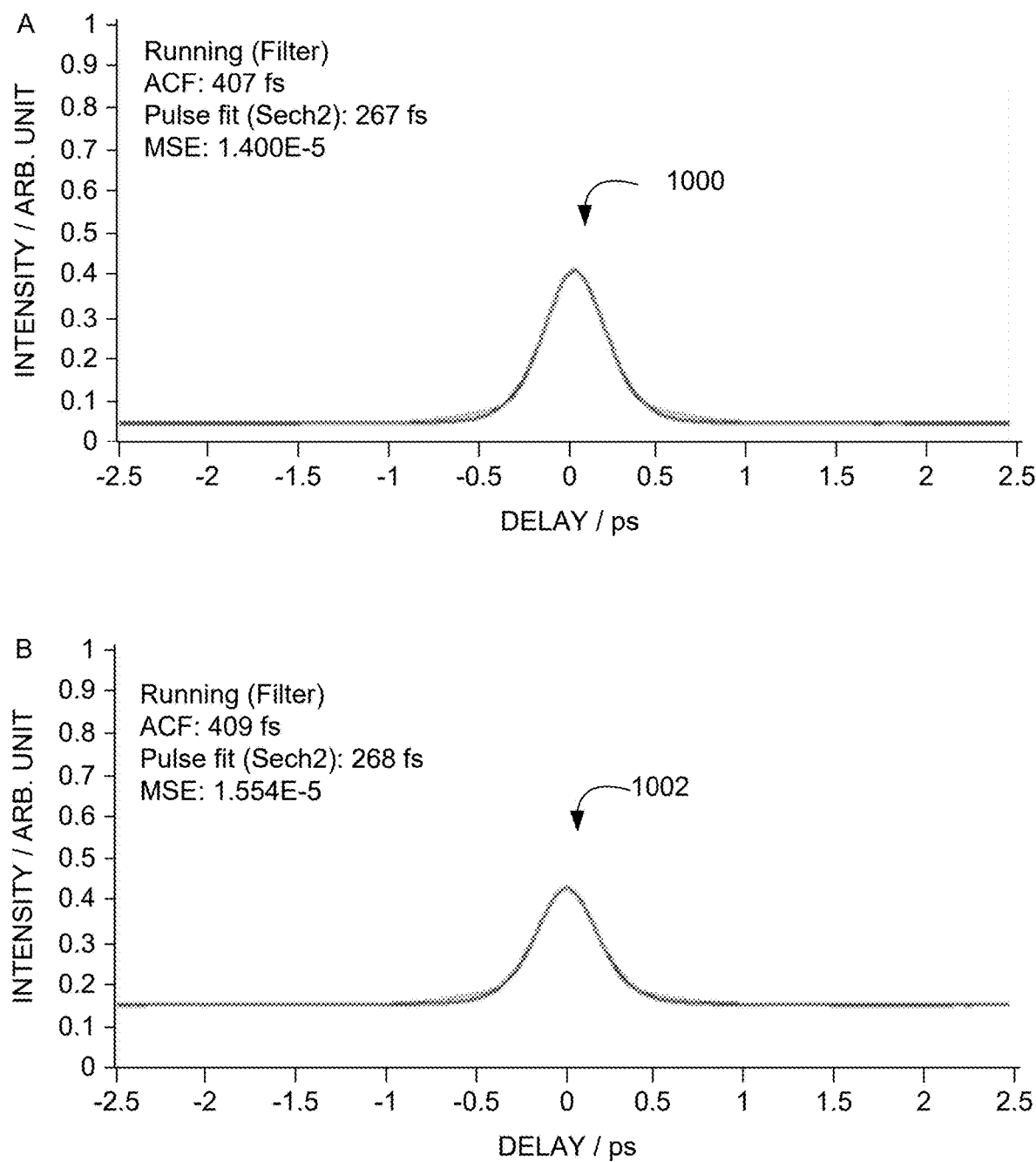
FIG. 10 shows example measured pulse durations of a fundamental frequency beam before and after a second-harmonic module.

As previously mentioned, second-harmonic generation is a nonlinear process (e.g., it scales with a light intensity to a power greater than one) and may elongate laser pulses in a harmonic module. However, to generate additional harmonic output beams, it may be helpful for the nonlinear optical medium not to elongate pulses significantly. FIG. 10 shows a measurement of a pulse duration 1000 of an input infrared laser pulse (e.g., before the harmonic module) and a measurement of a pulse duration 1002 of a residual infrared laser pulse (e.g., after the harmonic module). Pulse duration 1002 has not significantly changed from pulse duration 1000 (e.g., within experimental error). Where elongation does occur, in some examples, dispersion correction may be used, as described above.

Figure 11:
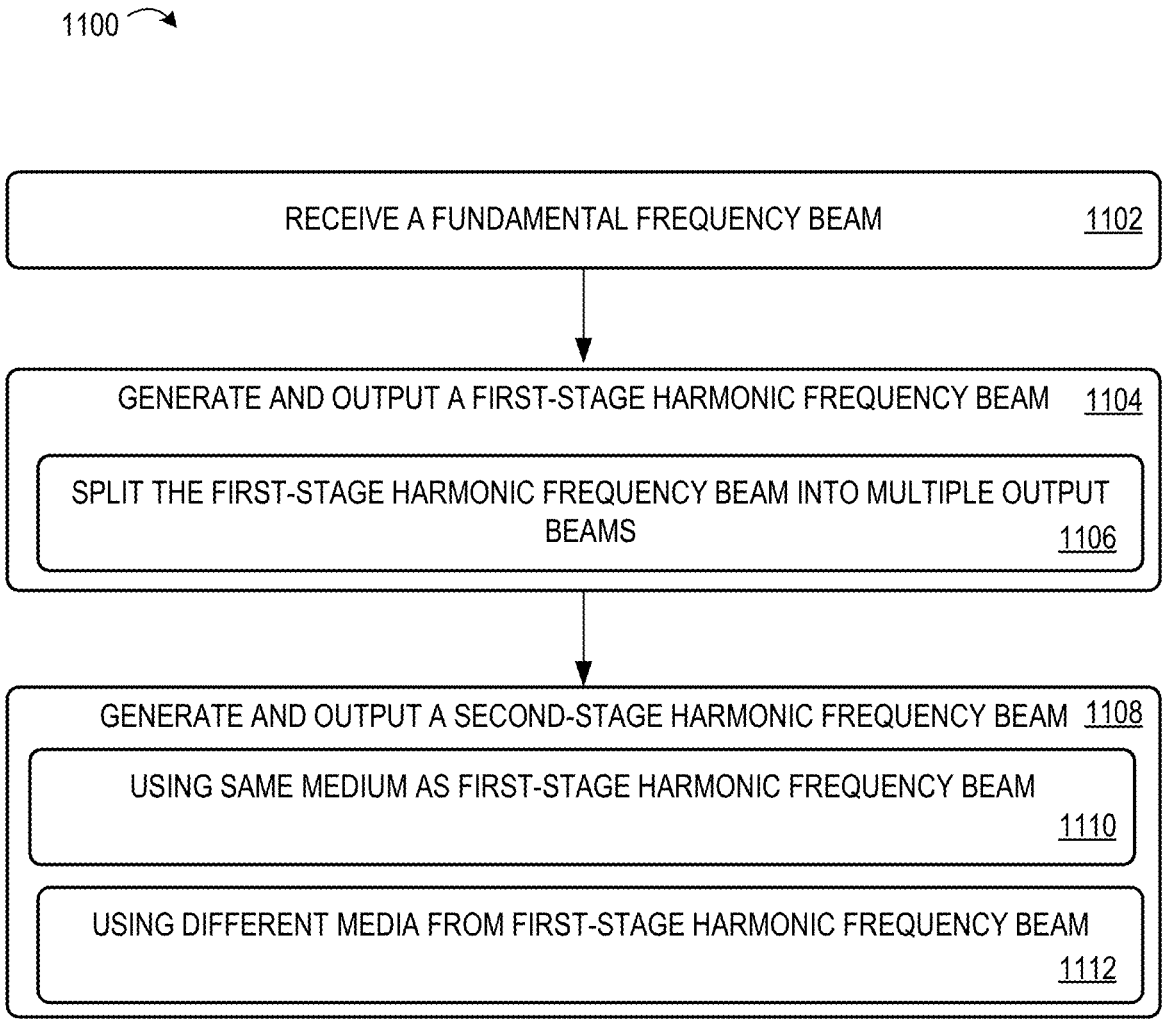
FIG. 11 shows a flow diagram of an example method for generating and outputting a plurality of harmonic frequency beams.

FIG. 11 depicts a flow diagram of an example method 1100 for outputting a plurality of harmonic output beams. Method 1100 may be enacted on any suitable laser system, such as those described herein. Method 1100 comprises, at 1102, receiving a fundamental frequency beam from a laser. In some examples, the fundamental frequency beam may comprise an infrared laser beam. Method 1100 further comprises, at 1104, generating and outputting, via a first harmonic-generation stage, a first-stage harmonic frequency beam from the fundamental frequency beam. In some examples, the first harmonic-generation stage may be configured for second-harmonic generation. In other examples, the first harmonic-generation stage may be configured to generate any other suitable harmonic. In some examples, method 1100 may comprise, at 1106, splitting the first-stage harmonic frequency beam using a beam splitter to generate a plurality of first-stage harmonic frequency beams for output.

Continuing, method 1100 further comprises, at 1108, generating and outputting, via a second harmonic-generation stage, a second-stage harmonic frequency beam based on a first-stage residual fundamental frequency beam from the first harmonic-generation stage. In some examples, method 1100 comprises, at 1110, generating, using a same nonlinear optical medium, the first-stage harmonic frequency beam and the second-stage harmonic frequency beam. In other examples, at 1112, different media may be used for different harmonic-generation stages.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
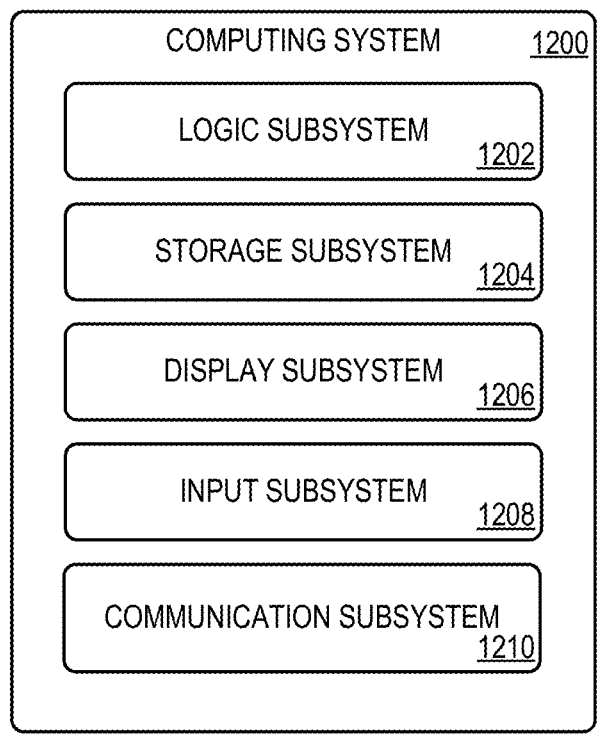
FIG. 12 shows an example computing system.

FIG. 12 schematically shows an example computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices. Controller 112, as well as controllers for any of the laser systems depicted herein, may be examples of computing system 1200.

Computing system 1200 includes a logic subsystem 1202 and a storage subsystem 1204. Computing system 1200 may optionally include a display subsystem 1206, input subsystem 1208, communication subsystem 1210, and/or other components not shown in FIG. 12.

Logic subsystem 1202 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 1204 includes one or more physical devices configured to hold instructions executable by the logic machine to implement the methods and processes described herein. When such methods and processes are implemented, the state of storage subsystem 1204 may be transformed—e.g., to hold different data.

Storage subsystem 1204 may include removable and/or built-in devices. Storage subsystem 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1204 may include volatile, nonvolatile, dynamic, static, read/write, read-only, random-access, sequential-access, location-addressable, file-addressable, and/or content-addressable devices.

It will be appreciated that storage subsystem 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1202 and storage subsystem 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1206 may be used to present a visual representation of data held by storage subsystem 1204. This visual representation may take the form of a graphical user interface (GUI). As the herein described methods and processes change the data held by the storage machine, and thus transform the state of the storage machine, the state of display subsystem 1206 may likewise be transformed to visually represent changes in the underlying data. Display subsystem 1206 may include one or more display devices utilizing virtually any type of technology. Such display devices may be combined with logic subsystem 1202 and/or storage subsystem 1204 in a shared enclosure, or such display devices may be peripheral display devices.

When included, input subsystem 1208 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

Another example provides a laser system, comprising, a laser configured to output a fundamental frequency beam, a first stage configured to receive an input of the fundamental frequency beam from the laser, to output from the laser system a first-stage harmonic frequency beam, and to output a first-stage residual fundamental frequency beam, and a second stage configured to receive an input of the first-stage residual fundamental frequency beam, and to output from the laser system a second-stage harmonic frequency beam. In some such examples, the laser alternatively or additionally comprises an ultrashort pulse laser. In some such examples, the laser system alternatively or additionally comprises a third stage configured to receive an input of a second residual fundamental frequency beam from the second stage, and to output from the laser system a third-stage harmonic frequency beam. In some such examples, the first-stage harmonic frequency beam and the second-stage harmonic frequency beam each alternatively or additionally comprises a second-harmonic of the fundamental frequency beam. In some such examples, the laser system alternatively or additionally is incorporated into a data writing system. In some such examples, the first stage and the second stage alternatively or additionally utilize a same nonlinear optical medium. In some such examples, the first stage alternatively or additionally comprises a first nonlinear optical medium and the second stage alternatively or additionally comprises a second nonlinear optical medium. In some such examples, the laser system alternatively or additionally comprises a beam splitter configured to split the first-stage harmonic frequency beam.

Another example provides, an optical system, comprising, a first stage configured to receive an input of a fundamental frequency beam from a laser, to output from the optical system a first-stage harmonic frequency beam, and to output a first-stage residual fundamental frequency beam, and a second stage configured to receive an input of the first-stage residual fundamental frequency beam, and to output from the optical system a second-stage harmonic frequency beam. In some such examples, the optical system alternatively or additionally comprises a first, greater number of first-stage beam splitters configured to split the first-stage harmonic frequency beam into a plurality of first-stage output beams, and a second, lesser number of second-stage beam splitters configured to split the second-stage harmonic frequency beam into a plurality of second-stage output beams. In some such examples, the plurality of first-stage output beams and the plurality of second-stage output beams alternatively or additionally are configured as write beams in a data writing system. In some such examples, the first stage alternatively or additionally comprises a first nonlinear optical medium, and the second stage alternatively or additionally comprises a second nonlinear optical medium. In some such examples, the first stage and the second stage alternatively or additionally utilize a same nonlinear optical medium. In some such examples, alternatively or additionally an optical path through the first stage and an optical path through the second stage are configured to temporally separate pulses of the fundamental frequency beam and the first-stage residual fundamental frequency beam in the same nonlinear optical medium. In some such examples, alternatively or additionally an optical path through the first stage and an optical path through the second stage are spatially separated in the same nonlinear optical medium. In some such examples, the optical system alternatively or additionally comprises a third stage configured to receive an input of a second-stage residual fundamental frequency beam from the second stage and to output from the optical system a third-stage harmonic frequency beam. In some such examples, the first-stage harmonic frequency beam and the second-stage harmonic frequency beam each alternatively or additionally comprises a second-harmonic of the fundamental frequency beam.

Another example provides, enacted on an optical system comprising a first harmonic-generation stage and a second harmonic-generation stage, a method comprising receiving a fundamental frequency beam from a laser, generating and outputting, via the first harmonic-generation stage, a first-stage harmonic frequency beam from the fundamental frequency beam, and generating and outputting, via the second harmonic-generation stage, a second-stage harmonic frequency beam based on a first-stage residual fundamental frequency beam from the first harmonic-generation stage. In some such examples, the method alternatively or additionally comprises splitting the first-stage harmonic frequency beam using a beam splitter to generate a plurality of first-stage harmonic frequency beams for output. In some such examples, generating the second-stage harmonic frequency beam alternately or additionally comprises generating, using a same nonlinear optical medium as the first harmonic-generation stage, the second-stage harmonic frequency beam.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system, comprising:
   a laser system comprising
     a laser configured to output a fundamental frequency beam, a first stage configured to receive an input of the fundamental frequency beam from the laser, to output from the laser system a first-stage harmonic frequency beam, and to output a first-stage residual fundamental frequency beam, a second stage configured to receive an input of the first-stage residual fundamental frequency beam, and to output from the laser system a second-stage harmonic frequency beam, and one or more beam splitters configured to split one or more of the first-stage harmonic frequency beam or the second-stage harmonic frequency beam into a plurality of harmonic frequency beams; and a data writing system comprising a modulator configured to receive the plurality of harmonic frequency beams from the laser system in parallel and write parallel data to a substrate by modulating the plurality of harmonic frequency beams received from the laser system.

2. The laser system of claim 1, wherein the laser comprises an ultrashort pulse laser.

3. The laser system of claim 1, further comprising a third stage configured to receive an input of a second residual fundamental frequency beam from the second stage, and to output from the laser system a third-stage harmonic frequency beam.

4. The laser system of claim 1, wherein the first-stage harmonic frequency beam and the second-stage harmonic frequency beam each comprises a second-harmonic of the fundamental frequency beam.

5. The laser system of claim 1, wherein the first stage and the second stage utilize a same nonlinear optical medium.

6. The laser system of claim 1, wherein the first stage comprises a first nonlinear optical medium and the second stage comprises a second nonlinear optical medium.

7. The laser system of claim 1, wherein the one or more beam splitters comprises a first plurality of beam splitters configured to split the first-stage harmonic frequency beam into a plurality of first-stage output beams of the plurality of harmonic frequency beams, and a second plurality of beam splitters configured to split the second-stage harmonic frequency beam into a plurality of second-stage output beams of the plurality of harmonic frequency beams.

8. A system, comprising:
an optical system comprising
a first stage configured to receive an input of a fundamental frequency beam from a laser, to output from the optical system a first-stage harmonic frequency beam, and to output a first-stage residual fundamental frequency beam, and a second stage configured to receive an input of the first-stage residual fundamental frequency beam, and to output from the optical system a second-stage harmonic frequency beam, and one or more beam splitters configured to split one or more of the first-stage harmonic frequency beam or the second-stage harmonic frequency beam into a plurality of harmonic frequency beams; and a data writing system comprising a modulator configured to receive the plurality of harmonic frequency beams from the optical system in parallel and write parallel data to a substrate by modulating the plurality of harmonic frequency beams received from the optical system.

9. The optical system of claim 8, wherein the one or more beam splitters comprises a first, greater number of first-stage beam splitters configured to split the first-stage harmonic frequency beam into a plurality of first-stage output beams, and a second, lesser number of second-stage beam splitters configured to split the second-stage harmonic frequency beam into a plurality of second-stage output beams, and wherein the plurality of harmonic frequency beams comprises the plurality of first-stage output beams and the plurality of second-stage output beams.

10. The optical system of claim 8, wherein the first stage comprises a first nonlinear optical medium, and the second stage comprises a second nonlinear optical medium.

11. The optical system of claim 8, wherein the first stage and the second stage utilize a same nonlinear optical medium.

12. The optical system of claim 11, wherein an optical path through the first stage and an optical path through the second stage are configured to temporally separate pulses of the fundamental frequency beam and the first-stage residual fundamental frequency beam in the same nonlinear optical medium.

13. The optical system of claim 11, wherein an optical path through the first stage and an optical path through the second stage are spatially separated in the same nonlinear optical medium.

14. The optical system of claim 8, further comprising a third stage configured to receive an input of a second-stage residual fundamental frequency beam from the second stage and to output from the optical system a third-stage harmonic frequency beam.

15. The optical system of claim 8, wherein the first-stage harmonic frequency beam and the second-stage harmonic frequency beam each comprises a second-harmonic of the fundamental frequency beam.

16. Enacted on an optical system comprising a first harmonic-generation stage and a second harmonic-generation stage, a method comprising:

receiving a fundamental frequency beam from a laser;

generating, via the first harmonic-generation stage, a first-stage harmonic frequency beam from the fundamental frequency beam;

generating, via the second harmonic-generation stage, a second-stage harmonic frequency beam based on a first-stage residual fundamental frequency beam from the first harmonic-generation stage; and generating and outputting a plurality of output beams from the first-stage harmonic frequency beam and the second-stage harmonic frequency beam for writing parallel data to a transparent substrate.

17. The method of claim 16, wherein generating the plurality of output beams comprises splitting the first-stage harmonic frequency beam and the second-stage harmonic frequency beam using one or more beam splitters to generate the plurality of output beams of similar power.

18. The method of claim 16, wherein generating the second-stage harmonic frequency beam comprises generating, using a same nonlinear optical medium as the first harmonic-generation stage, the second-stage harmonic frequency beam.

19. The system of claim 7, wherein the one or more beam splitters are configured to split the first-stage harmonic frequency beam into the plurality of first-stage output beams to generate each first-stage output beam of the plurality of first-stage output beams with similar power.

20. The system of claim 9, wherein each harmonic frequency beam of the plurality of harmonic frequency beams comprises similar power.

\* \* \* \* \*